United States Patent
Ueda et al.

(10) Patent No.: US 7,397,577 B2
(45) Date of Patent: Jul. 8, 2008

(54) PRINTING SYSTEM INCLUDING DIFFERENT KINDS OF PRINTERS AND A PRINTER SELECTING DEVICE THEREFOR

(75) Inventors: Kenichi Ueda, Watari-gun (JP); Hideaki Matsuda, Natori (JP); Mutsuo Ogawa, Atsugi (JP)

(73) Assignees: Tohoku Ricoh Co., Ltd., Shibata-gun (JP); Ricoh Company, Ltd., Tokyo (JP)

( * ) Notice: Subject to any disclaimer, the term of this patent is extended or adjusted under 35 U.S.C. 154(b) by 242 days.

(21) Appl. No.: 11/390,158

(22) Filed: Mar. 28, 2006

(65) Prior Publication Data

US 2006/0176515 A1    Aug. 10, 2006

Related U.S. Application Data

(62) Division of application No. 09/345,482, filed on Jul. 1, 1999, now Pat. No. 7,046,383.

(30) Foreign Application Priority Data

Jul. 2, 1998   (JP)   ................................. 10-187243
Apr. 19, 1999  (JP)   ................................. 11-110510

(51) Int. Cl.
  *G06F 15/00*   (2006.01)
  *G06K 3/12*    (2006.01)
  *G06K 1/00*    (2006.01)
(52) U.S. Cl. ...................... 358/1.15; 358/1.14; 358/1.13
(58) Field of Classification Search ................. 358/1.1, 358/1.13, 1.14, 1.15, 1.9
  See application file for complete search history.

(56) References Cited

U.S. PATENT DOCUMENTS

| | | | |
|---|---|---|---|
| 6,088,120 A | 7/2000 | Shibusawa et al. | |
| 6,337,745 B1 | 1/2002 | Aiello, Jr. et al. | |
| 6,348,971 B2 | 2/2002 | Owa et al. | |
| 6,348,972 B1 | 2/2002 | Taniguchi et al. | |
| 6,686,964 B1 * | 2/2004 | Makishima et al. | .... 348/333.02 |

FOREIGN PATENT DOCUMENTS

| | | |
|---|---|---|
| JP | 64-72189 | 3/1989 |
| JP | 1-217369 | 8/1989 |
| JP | 2-190378 | 7/1990 |
| JP | 4-153814 | 5/1992 |
| JP | 5-10642 | 1/1993 |
| JP | 6-274292 | 9/1994 |
| JP | 7-214872 | 8/1995 |
| JP | 7-261953 | 10/1995 |

(Continued)

*Primary Examiner*—Douglas Q Tran
(74) *Attorney, Agent, or Firm*—Oblon, Spivak, McClelland, Maier & Neustadt, P.C.

(57) ABSTRACT

A printing system including a plurality of different kinds of printers and a printer selecting device therefore are disclosed. The printer selecting device includes an accepting section for accepting information representative of a desired number of printings input, and selecting means for selecting one of the printers matching with the desired number of printings. Image data to be printed are sent from the printer selecting device to the printer selected. In this configuration, one printer adequate for the desired number of printings, which is an important factor for the selection of a printer, is automatically selected.

4 Claims, 11 Drawing Sheets

FOREIGN PATENT DOCUMENTS

| | | |
|---|---|---|
| JP | 8-22222 | 1/1996 |
| JP | 8-95964 | 4/1996 |
| JP | 9-6557 | 1/1997 |
| JP | 9-123400 | 5/1997 |
| JP | 9-244474 | 9/1997 |
| JP | 9-330190 | 12/1997 |
| JP | 10-055255 | 2/1998 |
| JP | 10-149268 | 6/1998 |
| JP | 11-53142 | 2/1999 |

* cited by examiner

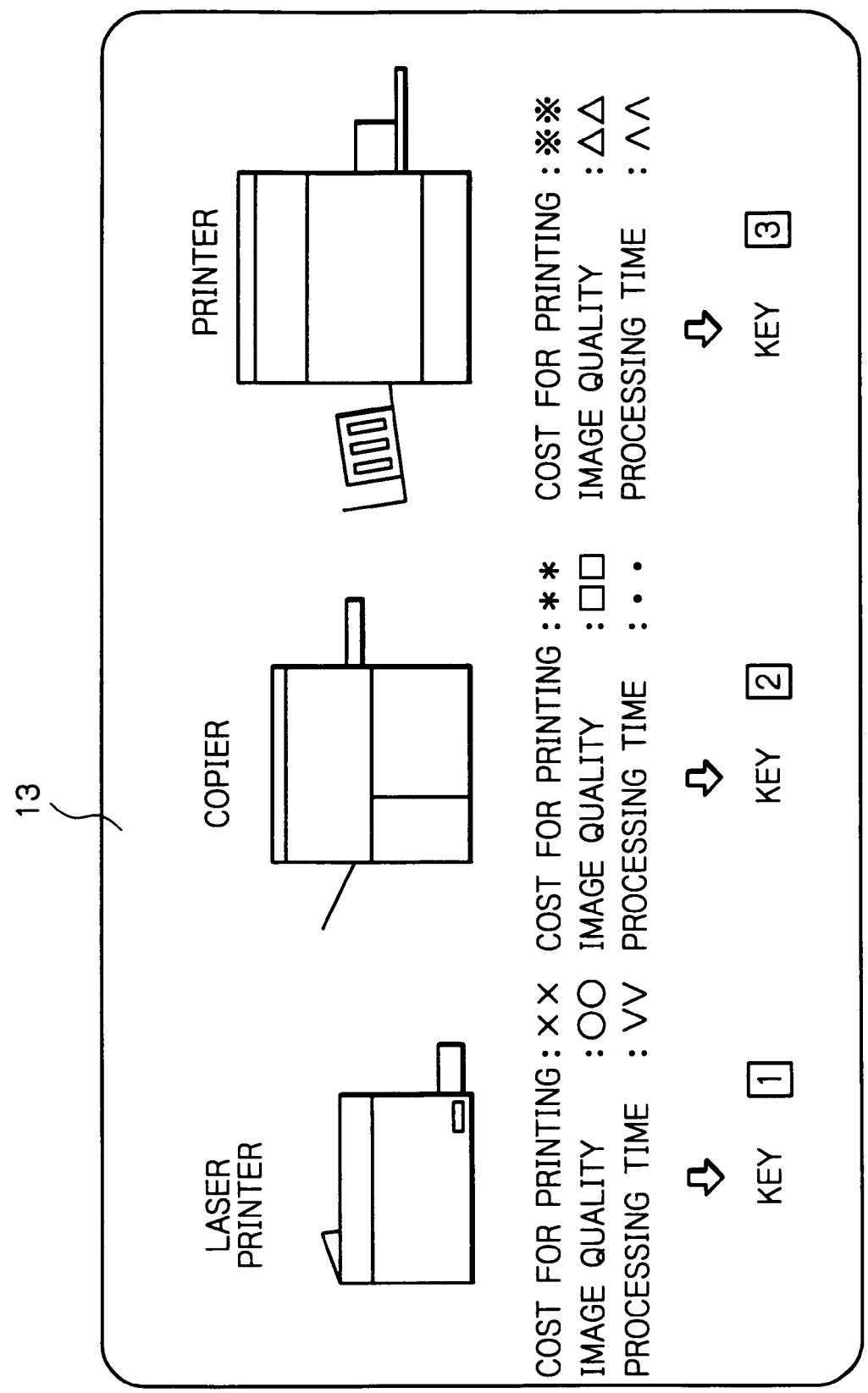

PRINTING SYSTEM INCLUDING DIFFERENT KINDS OF PRINTERS AND A PRINTER SELECTING DEVICE THEREFOR

CROSS-REFERENCE TO RELATED APPLICATION

The present application is a divisional of U.S. application Ser. No. 09/345,482 filed on Jul. 1, 1999 now U.S. Pat. No. 7,046,383, and in turn claims priority to JP 10-187243 filed on Jul. 2, 1998 and JP 11-110510 filed on Apr. 19, 1999, the entire contents of each of which are hereby incorporated herein by reference.

BACKGROUND OF THE INVENTION

The present invention relates to a printing system including a plurality of different kinds of printers connected to each other, and a printer selecting device therefor.

It has been customary to arrange a printer and a scanner or similar image data supply device in a pair. In a digital copier, for example, while a scanner or image data supply device reads a document image, a printer electrophotographically prints out image data representative of the document image and output from the scanner. A facsimile apparatus with a data sending and transmitting capability is constructed in substantially the same manner as the digital copier. Also, a stencil printer is similar to the digital copier except that the printer uses a stencil. A laser printer or similar electrophotographic printer may be connected to a word processor, personal computer or similar image data supply device which outputs image data in the form of an electronic document. An image scanner may be connected to such a printer via, e.g., a personal computer.

There has recently been proposed and put to practical use a printing system including the above image data supply devices and printers distributed on a network, e.g., LAN. This printing system allows the image data supply devices to share the printers and is disclosed in, e.g., Japanese Patent Laid-Open Publication Nos. 4-153814, 7-214872 and 9-330190. In a specific printing system, a plurality of image data supply devices share a single printer or a plurality of printers of the same kind, e.g., laser printers. In another specific printing system, a plurality of image data supply devices share a plurality of printers different in kind or performance, e.g., a laser printer, a digital copier, and a stencil printer. The system including different kinds of printers allows the operator to select desired one of the printers and thereby makes the most of the advantage of the individual printer. A laser printer, for example, enhances image quality while a stencil printer reduces the printing cost when a great number of printings are desired.

However, the problem with the conventional printing systems is that although the printers are selectable, it is difficult and troublesome for the operator to determine which printer is adequate at the time of printing. More specifically, although the printers in the network environment are selectable, the reference for selection depends merely on the operator's knowledge and experience. This prevents a person lacking the knowledge of printers from selecting an adequate printer and thereby prevents the advantage of the individual printer from being made most of.

Technologies relating to the present invention are also disclosed in, e.g., Japanese Patent Laid-Open Publication Nos. 6-274292, 7-261953 and 10-55255.

SUMMARY OF THE INVENTION

It is therefore an object of the present invention to provide a printing system including a plural ity of different kinds of printers and a printer selecting device capable of easily selecting adequate one of the printers.

It is another object of the present invention to provide a printing system including a plurality of different kinds of printers including a stencil printer suitable for the production of a great number of printings, and a printer selecting device capable of easily selecting adequate one of the printers.

In accordance with the present invention, a printer selecting device includes an accepting section for accepting information representative of a desired number of printings input. A selecting section selects adequate one of a plurality of printers matching with the desired number of printings. A data outputting section outputs image data to be printed to the printer selected.

Also, in accordance with the present invention, a printing system includes at least one image data supply device for outputting image data to be printed. At least one number setting device sets a desired number of printings. A plurality of different kinds of printers each are capable of printing the image data received from the image data supply device. A printer selecting device includes an accepting section for accepting information representative of the desired number of printings input, a selecting section for selecting adequate one of the printers matching with the desired number of printings, and a data outputting section for outputting the image data to the printer selected.

BRIEF DESCRIPTION OF THE DRAWINGS

The above and other objects, features and advantages of the present invention will become more apparent from the following detailed description taken with the accompanying drawings in which:

FIG. 12 is a front view showing a specific picture to appear on a display included in the alternative embodiment.

DESCRIPTION OF THE PREFERRED EMBODIMENTS

Figure 1:
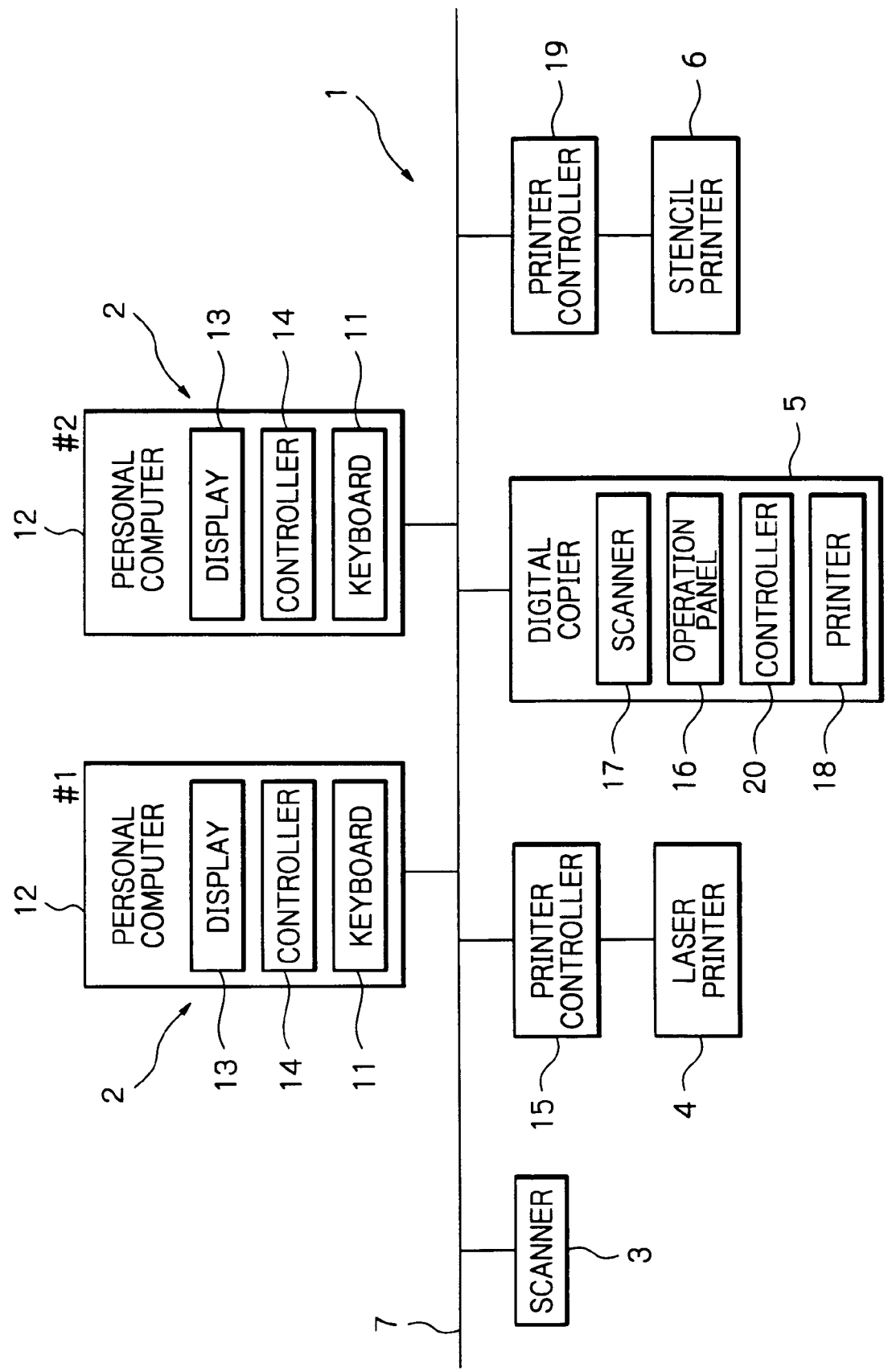
FIG. 1 is a block diagram schematically showing a printing system embodying the present invention.

Referring to FIG. 1 of the drawings, a printing system embodying the present invention is shown and generally designated by the reference numeral 1. As shown, the printing system 1 includes a plurality of personal computers (PCs) 2 (#1, #2, . . . ), a scanner 3, a laser printer 4, a digital copier 5, and a stencil printer 6. Of course, the system 1 may include a single PC in place of the plurality of PCs 2. The PCs 2, scanner 3, laser printer 4, digital copier and stencil printer 6 are interconnected by LAN or similar network for interchanging data with each other.

While the PCs 2 may be of the same kind or of different kinds, they are assume to be identical in major configuration hereinafter. The following description will concentrate on one of the PCs 2. The PC 2 includes a PC body 12, a keyboard 11 and a display 13 and generally has a document preparing function. Because the PC 2 is capable of supplying image data to be printed as an electronic document, it belongs to a family of image data supply devices referred to in the specification. The operator of the PC 2 inputs various kinds of information on the keyboard 11 and inputs, at the time of printing of an electronic document, a desired number of printings (or copies) on the keyboard 11. The display 13 displays various kinds of information including a printer selected, as will be described specifically later.

A controller 14 for executing various functions available with the PC 2 is built in the PC body 12 and implemented by, e.g., a microprocessor. The controller 14 includes a printer selecting device which will be described later. In this manner, the PC 2 has not only the image data supplying function but also a number inputting function and a printer selecting function and therefore serves as a terminal unit for a simple printer. The scanner 3, which is another image data supply device, is capable of reading a document image with an image sensor or optical reading device and outputting digital image data representative of the document image.

The laser printer 4, which is a simple printer, includes a photoconductive element and executes an electrophotographic process for forming an image with toner in accordance with image data. The laser printer 4 includes a printer controller 15 for receiving image data via the LAN 7.

The digital copier 5, which is another simple printer, includes an operation panel 16, a scanner 17, and a printer 18. The printer 18 also includes a photoconductive element and executes an electrophotographic process for forming an image with toner in accordance with image data. The scanner 17 is capable of reading a document image with an image sensor or similar optical reading device and outputting digital image data representative of the image sensor and, in this sense, constitutes one of image data supply devices. The operation panel 16 has keys including numeral keys and a display implemented by an LC (Liquid Crystal) touch panel. Switches included in the keys and LC touch panel allow the operator to input desired information including a desired number of copies, so that the switches also constitute a number setting device. The LC touch panel displays various kinds of information including a printer selected for printing an electronic document. In this manner, the copier 5 plays the role of a multiplex image processing machine with an image feeding function and a number setting function while playing the role of a printer.

The stencil printer 6, which is another simple printer, includes an ink drum for wrapping a master or perforated stencil therearound. The stencil printer 6 prints an image on a paper with ink via the master in accordance with image data. The stencil printer 6 includes a printer controller 19 for receiving image data via the LAN 7.

As stated above, the printing system 1 includes three different kinds of printers, i.e., the laser printer 4, digital copier 5 and stencil printer 6. As for a printing cost for a single printing, the laser printer 4 and digital copier 5 each using toner do not noticeably vary. By contrast, the stencil printer 6 using masters and ink reduces the printing cost for a single printing with an increase in the desired number of printings. Therefore, at the present stage of development, the stencil printer 6 is lower in printing cost than the laser printer 4 and digital copier 5 for a given number of printings, e.g., ten or more printings.

Figure 2:
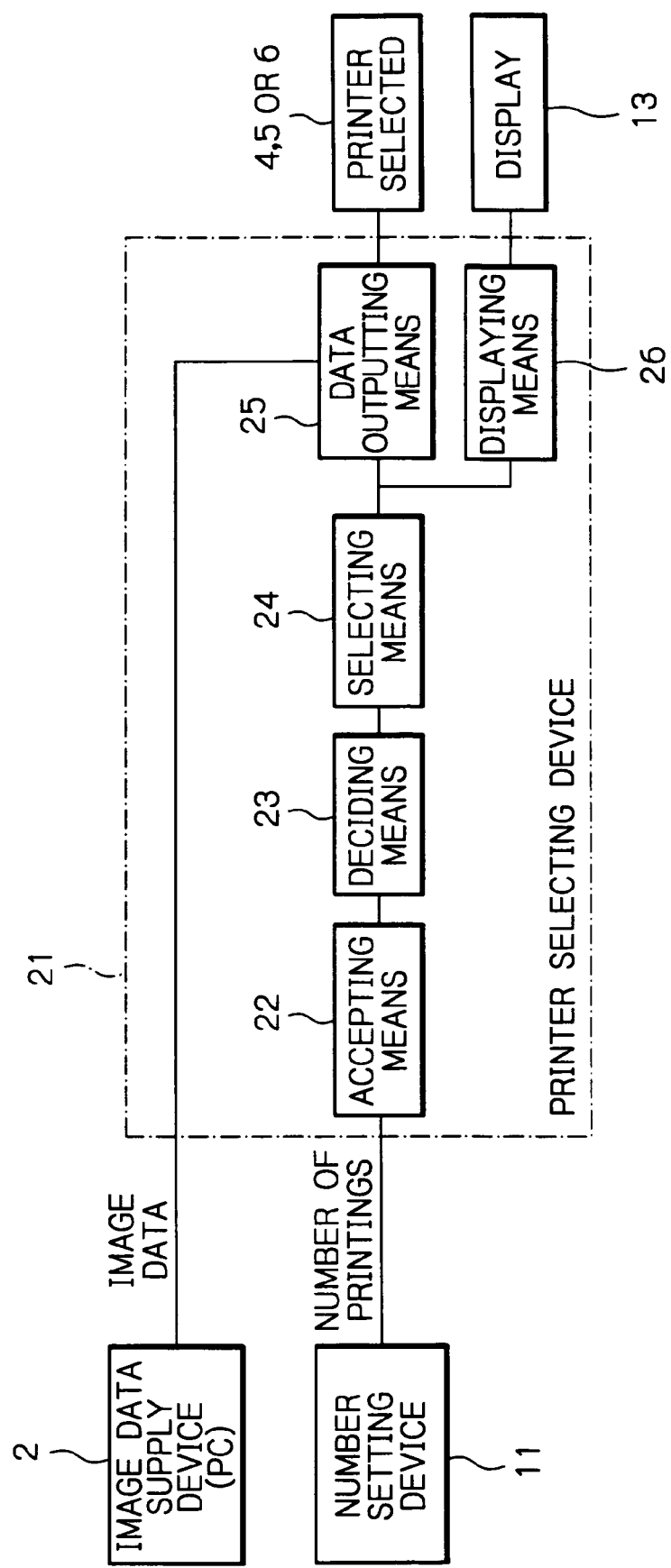
FIG. 2 is a schematic block diagram showing a printer selecting device included in the illustrative embodiment.

Reference will be made to FIG. 2 for describing the printer selecting device built in the controller 14 of the PC 2 specifically. As shown, the printer selecting device, generally 21, is generally made up of accepting means 22, deciding means 23, selecting means 24, data outputting means 25, and displaying means 26. The microprocessor constituting the controller 14 controls the above various means.

The accepting means 22 accepts a desired number of printings input on the keyboard, or number setting device, 11 when image data prepared by the PC2 or ready by the scanner 3 should be printed. More specifically, printer selection utility software is stored in the PC 2 for playing the role of the accepting means 22. When a print command is input via the application software of the PC 2, the above printer selection utility software starts up and sets a desired number of printings. In this connection, when "file" and "print" are sequentially selected on a personal computer, "printer" is usually displayed on the personal computer together with "status", "kind", "location" and "comment" without regard to the kind of basic software. In the illustrative embodiment, the PC 2 displays "printer selection utility" in place of the above "printer". More specifically, when the PC 2 displays "printer selection utility", it does not display a printer which will be selected, but causes the printer selection utility to select a suitable printer and display the printer selected.

The deciding means 23 compares the number of printings and a preselected reference number and delivers the result of comparison to the selecting means 24. In response, the selecting means 24 automatically selects one of the laser printer 4, digital copier 5 and stencil printer 6 matching with the number of printings accepted by the accepting means 22, i.e., in accordance with the result of comparison.

The data outputting means 25 automatically sends image data prepared by the PC 2 to the printer 4, 5 or 6 selected by the selecting means 24. The displaying means 26 displays the printer 4, 5 or 6 selected by the selecting means 24 on the display 13.

Figure 3:
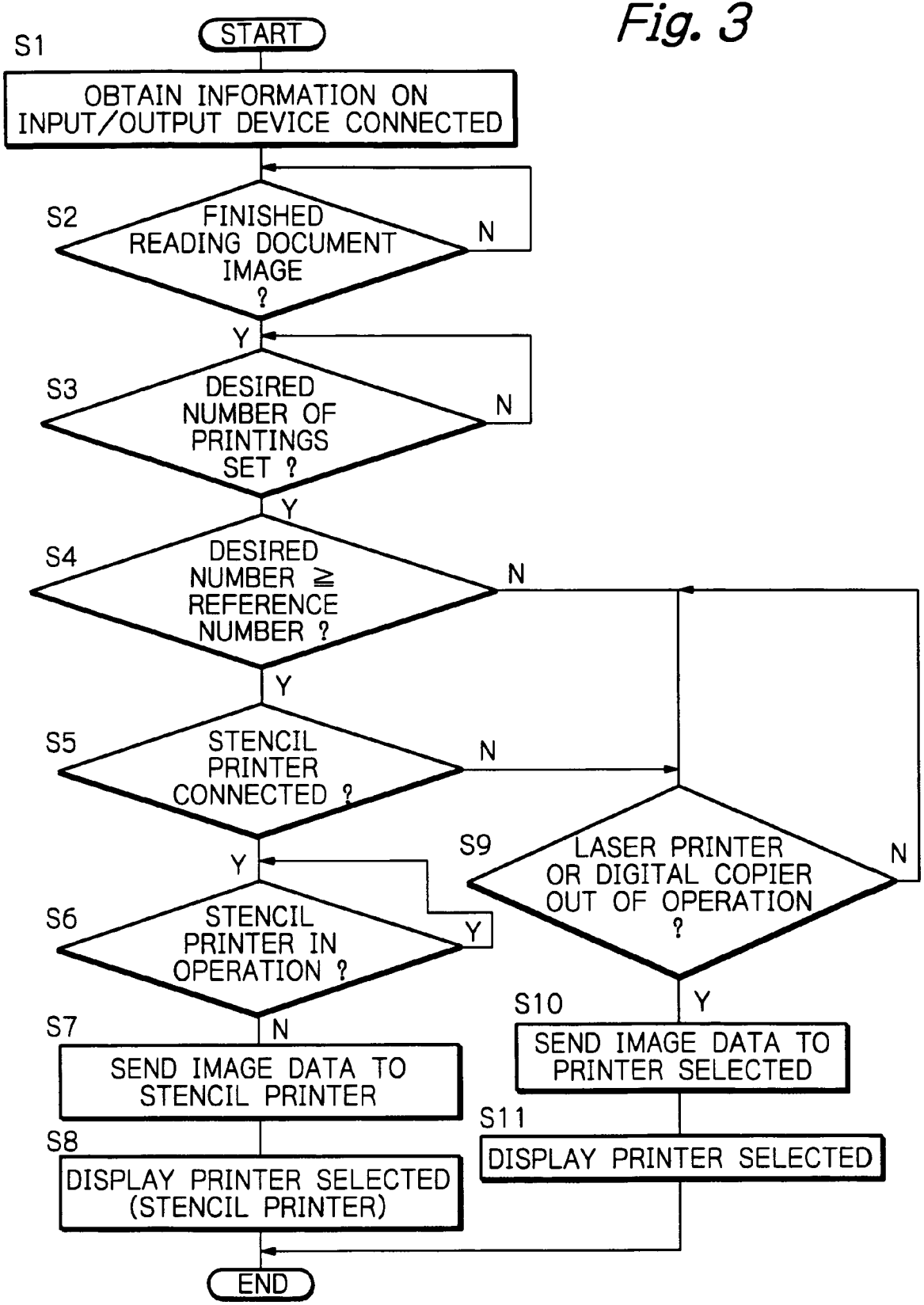
FIG. 3 is a flowchart demonstrating a specific printer selection procedure available with the illustrative embodiment.

FIG. 3 demonstrates a specific procedure to be executed by the controller or microprocessor 14 of the PC 2 when image data read by the scanner 3 should be printed on the basis of the operation of the PC 2. As shown, the controller 14 obtains information on the input and output devices connected to the printing system 1, i.e., the scanner 3 and printers 4, 5 and 6 (step S1). Then, the controller 14 determines whether or not the scanner 3 has finished reading a document image (step S2). If the answer of the step S2 is positive (Y), the controller 14 checks the keyboard 11 to see if the operator has input a desired number of printings or not (step S3). If the answer of the step S3 is Y, the controller 14 causes the printer selecting device to operate. Specifically, in the printer selecting device, the accepting means 22 accepts the desired number of printings input on the keyboard 11, and the deciding means 23 compares the desired number with the reference number which may be "10" (step S4).

If the desired number is greater than the reference number inclusive (Y, step S4), the controller 14 determines whether or not the stencil printer 6 is connected to the printing system 1 (step S5). If the answer of the step S5 is Y, the controller 14 causes the selecting means 24 to select the stencil printer 6 as a printer suitable for the desired number of printings. Subsequently, the controller 14 determines whether or not the stencil printer 6 is in operation (step S6). If the answer of the step S6 is negative (N), the controller 14 causes the data outputting means 25 to send the image data to the stencil printer 6 (step S7). At this instant, the controller 14 causes the displaying means 26 to display the selection of the stencil printer 6 on the display 13 (step S8). This is followed by printing operation customary with the stencil printer 6.

Assume that the desired number of printings is smaller than the reference number (N, step S4) or that the stencil printer is not connected to the printing system 1 (N, step S5). Then, the controller 14 causes the selecting means 24 to select the laser printer 4 or the digital copier 5 as an adequate printer (Y, step S9). Subsequently, the controller 14 causes the data outputting means 25 to send the image data to the laser printer 4 or the digital copier 5 selected. At the same time, the controller 14 causes the displaying means 26 to display the laser printer 4 or the digital copier 5 selected on the display 13 (step S11). This is followed by printing operation customary with the laser printer 4 or the digital copier 5 selected.

As stated above, only if the operator of the PC 2 inputs a desired number of printings on the keyboard 11, the controller 14 automatically selects one of the printers 4-6 matching with the number of printings which is one of important factors for the selection of a printer. This promotes easy selection of an adequate printer.

Particularly, the illustrative embodiment includes the stencil printer 6 capable of reducing the printing cost for a single printing with an increase in the number of printings. The stencil printer 6 is automatically selected when the desired number of printings is greater than the reference number, e.g., "10" which is advantageous from the cost standpoint. More specifically, one of major advantages of the stencil printer 6 is that it can produce printings with a single master at a high speed and at a constant low cost. To calculate printing costs including the costs of masters, the printer selection utility software calculates a particular cost of a master for each number of printings. Because the cost of a master and that of ink cost depend on the kind of a master and that of ink, the user is expected to input them. This allows the user to customize the printing costs, or reference for selection, and thereby enhances convenient use of the printing system 1.

The display 13 showing the printer automatically selected allows the user to easily confirm the printer before actual printing operation. Particularly, a printer cannot sometimes be simply selected on the basis of the printing cost and printing speed, depending on the kinds of printers included in a system configuration and functions available therewith. For example, assume that the operator desires full-color printings or resolution as high as 1,200 dpi (dots per inch). Then, the state-of-the-art stencil printer 6 cannot produce desirable full-color printings or implement high resolution as high as 1,200 dpi.

In light of the above, attributes or characteristics may be displayed together with a printer automatically selected, so that the operator can accept the printer or replace it with another printer. There may be additionally displayed how much the stencil printer 6 is lower in printing cost than the other printers when selected on the basis of the number of printings. Further, at least the stencil printer 6 may be registered at the printing system 1 beforehand as an essential printer. Then, when the printer selecting device 21 cannot find the stencil printer 6 because of, e.g., the power-off state of the printer 6, a message for urging the operator to turn on the power switch of the printer 6 may be displayed. The whole printing system 1 can therefore make the most of the advantage available with each of the different kinds of printers 4-6.

While the printing system 1 has been shown and described as printing image data output from the scanner 3 on the basis of the operation of the PC 2, it is capable of printing an electronic document prepared on the PC 2 in the same manner.

In the above embodiment, the printer selecting device 21 is built in the controller 14 of the PC 2. Alternatively, as shown in FIG. 1, a controller or microprocessor 20 may be built in the digital copier or multiplex image processing machine 5 and include a device similar to the printer selecting device 21. The device included in the controller 20 operates in the same manner as the device 21 when the printing system 1 prints image data output from the scanner 17 on the basis of operation of the operation panel 16.

While the stencil printer 6 is implemented as a simple printer in the illustrative embodiment, it, like the digital copier 5, may be implemented as a multiplex image processing machine including a scanner or image data supply device, an operation panel or number setting device, and a printer selecting device. In this case, when the desired number of printings is less than the reference number, e.g., "10", they may be output via the laser printer 4 or the digital printer 5.

Figure 4:
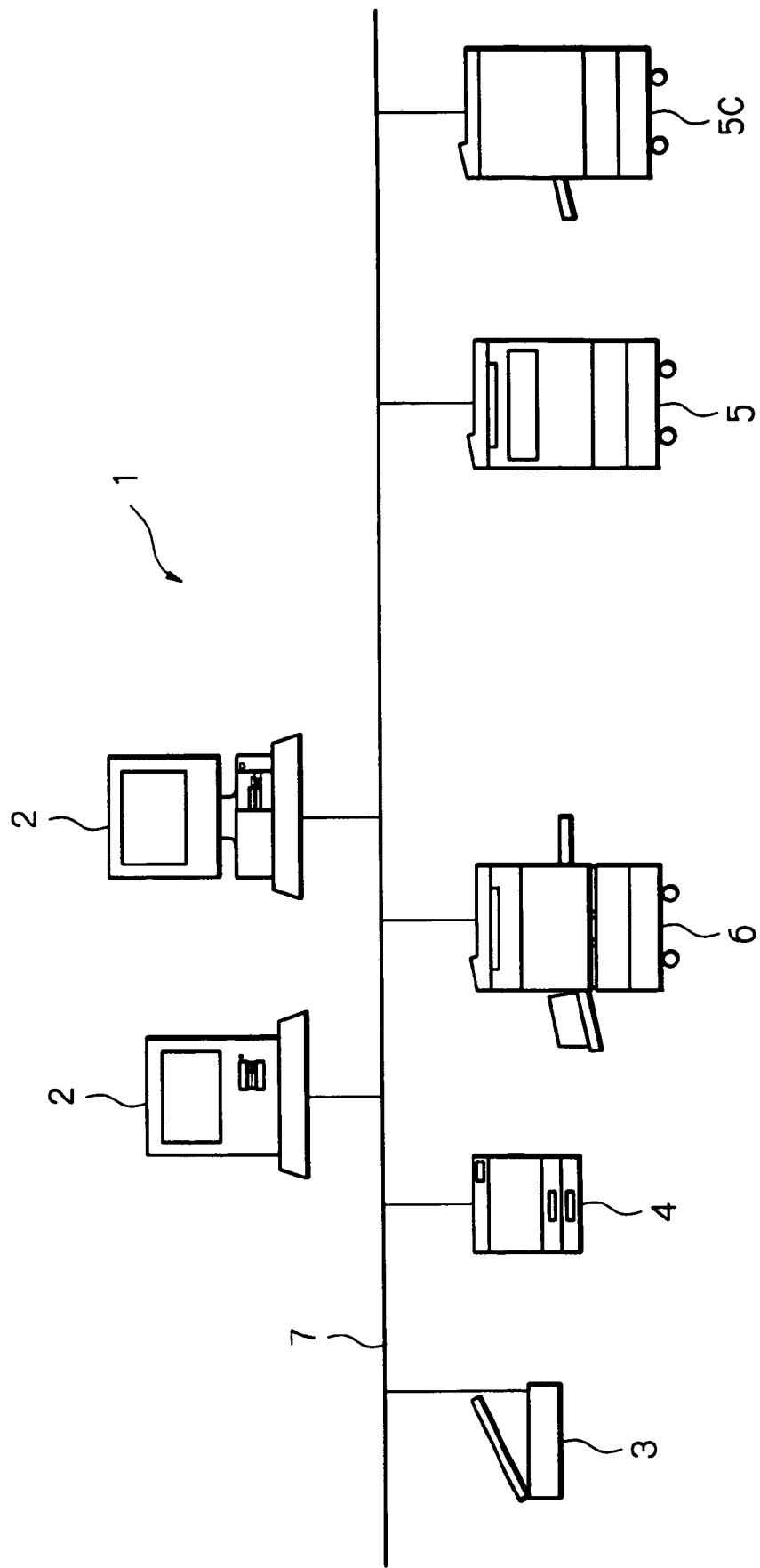
FIG. 4 is a diagram showing a modification of the illustrative embodiment.

FIG. 4 shows a modification of the printing system 1. As shown, the printing system 1 includes a full-color digital copier 5C in addition to the digital copier 5. That is, the system 1 may accommodate a plurality of apparatuses of each kind some of which are adaptive to color image formation.

The laser printer 4 serving as a simple printer may be replaced with an ink jet printer or a dot printer, if desired. Likewise, the digital copier 5 may be replaced with a facsimile apparatus.

Figure 5:
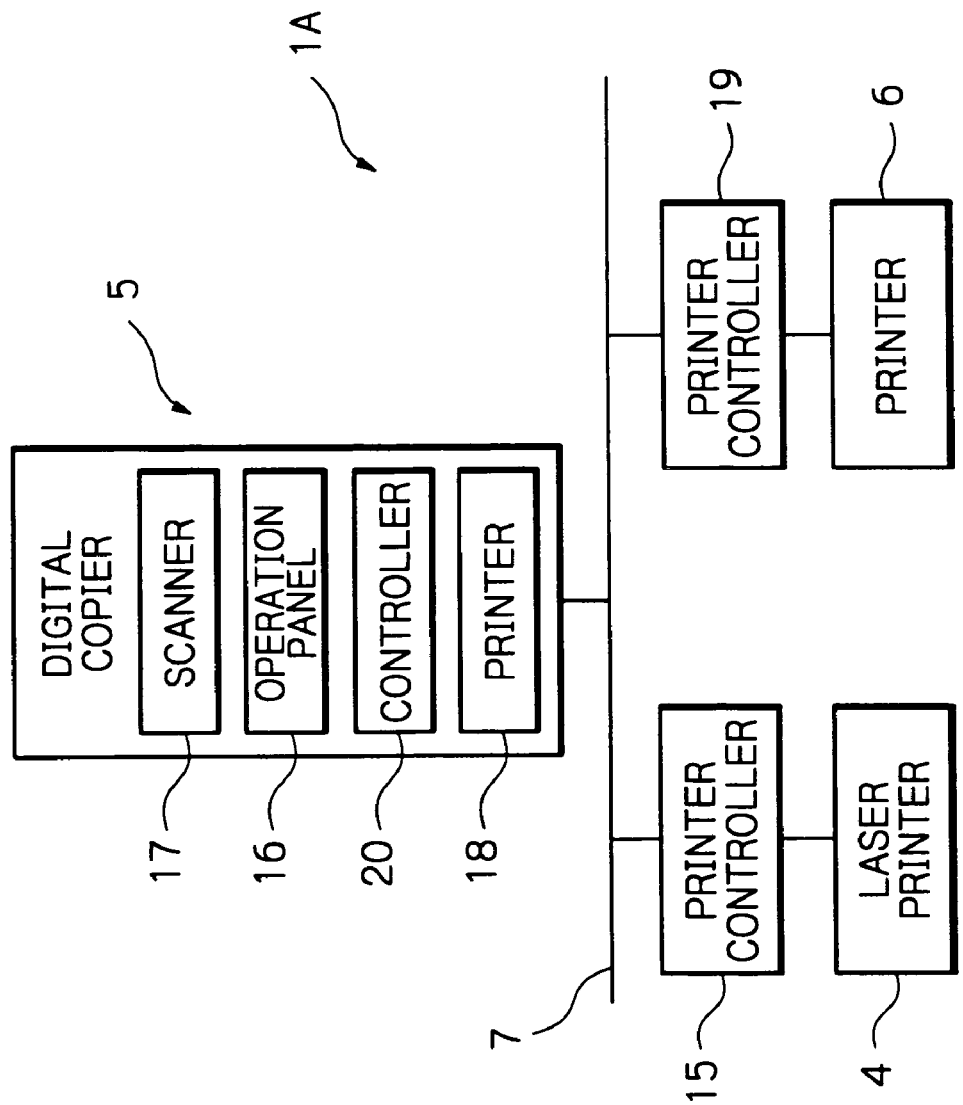
FIGS. 5-7 are schematic block diagrams each showing another modification of the illustrative embodiment.

FIG. 5 shows another modification of the illustrative embodiment. As shown, a printing system 1A does not include the PCs 2, but includes the digital copier or image data supply device 5 with the controller 20 in which the printer selecting device is bui It in.

Figure 6:
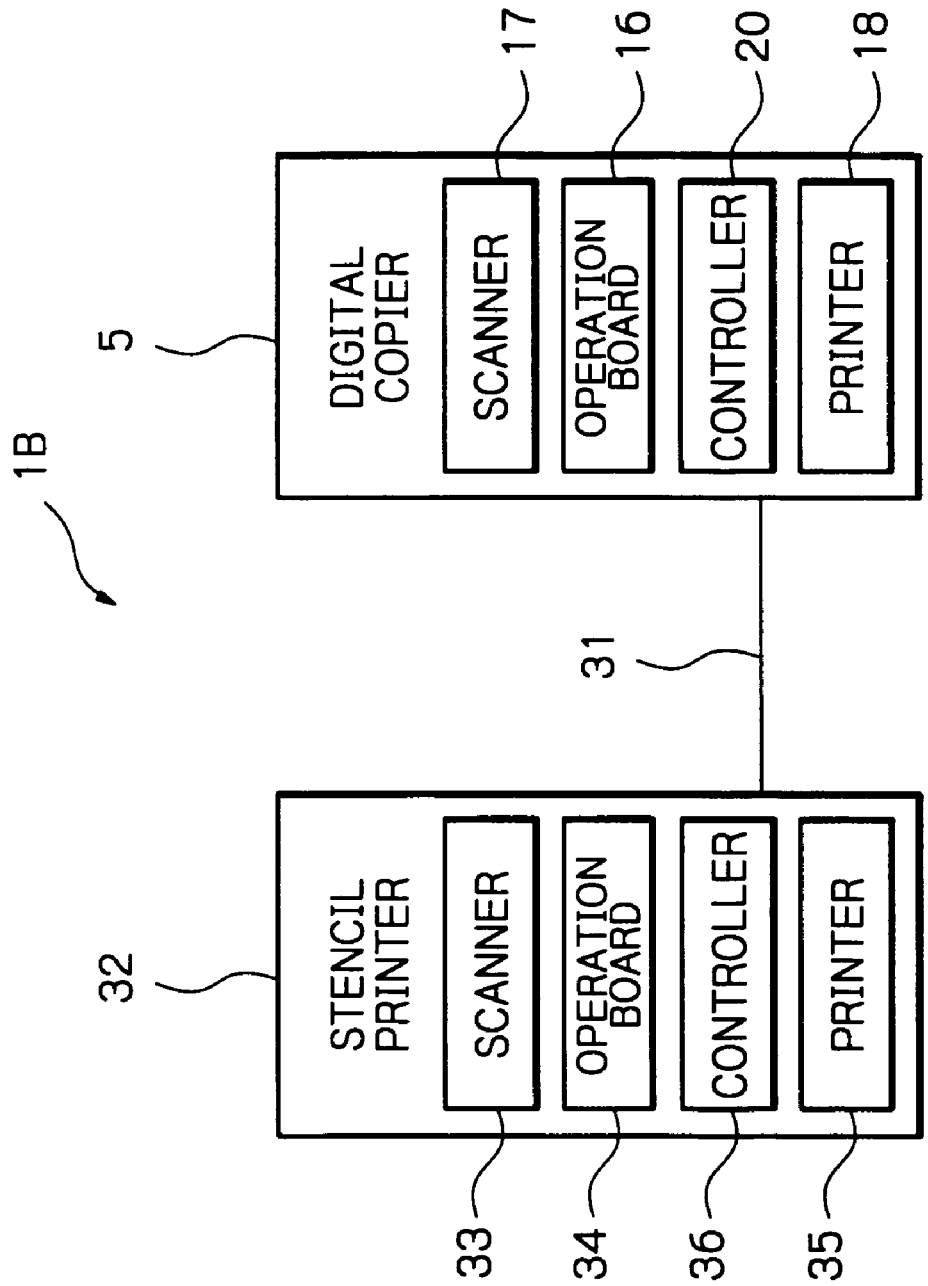

FIG. 6 shows still another modification of the illustrative embodiment. As shown, a printing system 1B includes the digital copier 5 and a stencil printer 32 interconnected by a simple cable 31 as distinguished from the LAN 7 or similar network. The digital copier 5 and stencil printer 32 each serves as a multiplex image processing machine alone. Specifically, the stencil printer 32, like the digital copier 5, includes a scanner 33, an operation panel 34, a printer 35, and a controller 36. In operation, when the desired number of printings input on the operation panel 16 of the digital copier 5 is greater than the reference number inclusive, an external output mode is automatically selected. When the operator recognizing the external output mode presses an acknowledge key, image data read by the scanner 17 are sent to the outside, i.e., the stencil printer 32. In this sense, the digital copier 5 bifunctions as a number setting device and a printer selecting device.

A printer function available with a digital copier has customarily referred to the fact that the copier functions as a printer when connected to a personal computer. In the modification shown in FIG. 6, the digital copier 5 has a function of outputting image data from its scanner 17 to the outside. Therefore, connecting the multiplex stencil printer 32 to the copier 5 as an external output unit is particularly successful to reduce the printing cost when the desired number of printings is great.

Figure 7:
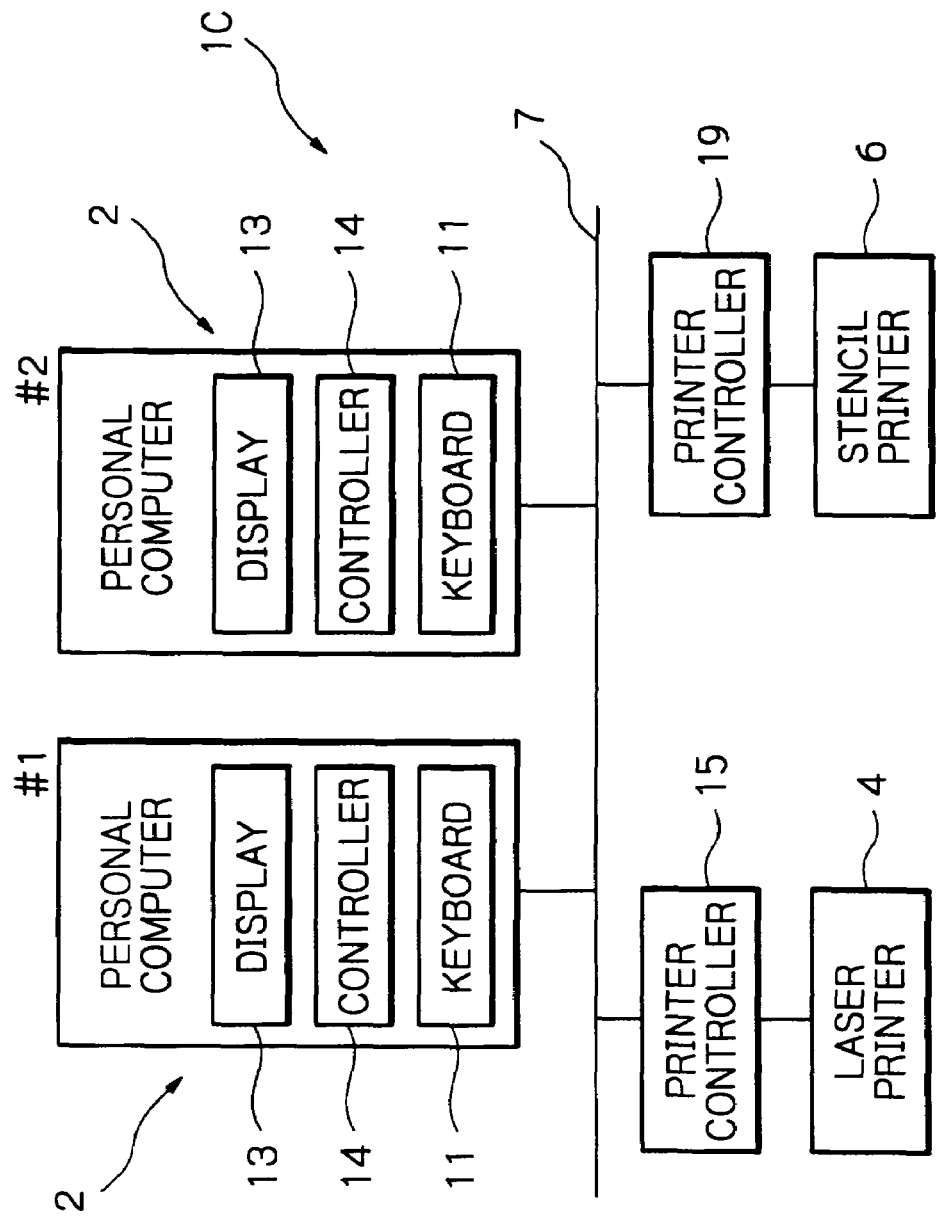

FIG. 7 shows yet another modification of the illustrative embodiment. As shown, a printing system 1C includes the laser printer 4 and stencil printer 6 each having a simple printing function and connected to the LAN 7. All image data to be printed out are fed from the PCs 2 to the laser printer 4 or the stencil printer 6.

Figure 8:
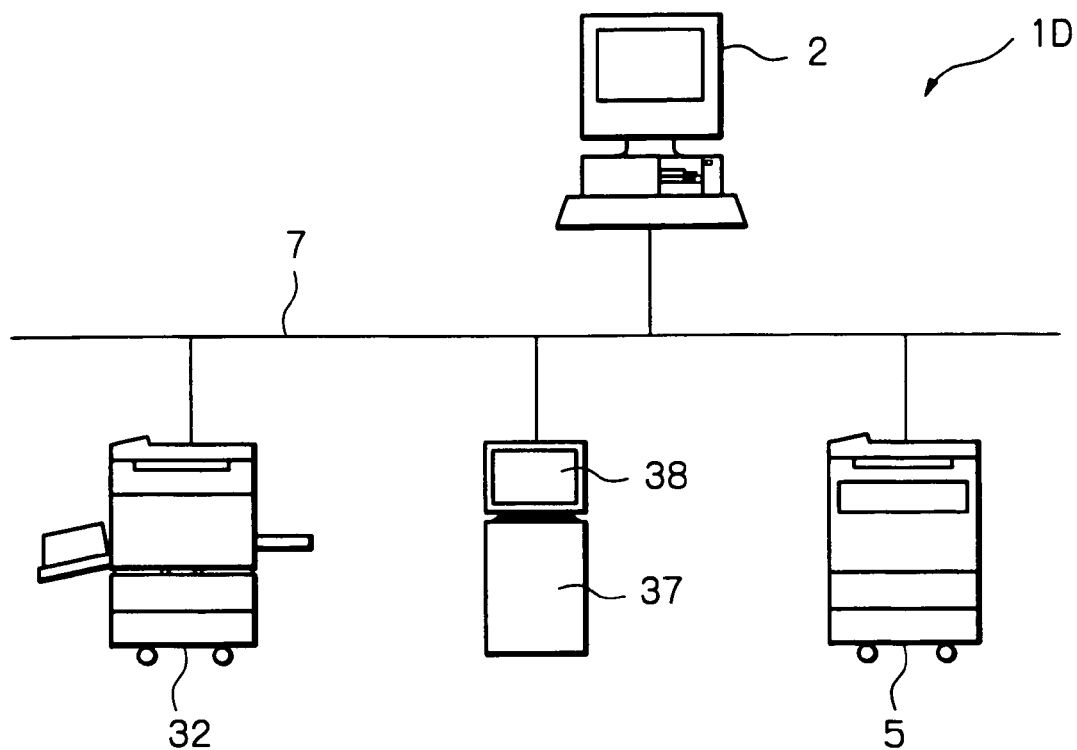
FIGS. 8 and 9 are diagrams each showing still another modification of the illustrative embodiment.

FIG. 8 shows a further modification of the illustrative embodiment. As shown, a printing system 1D includes a printer selecting device 37 constructed into a unit and connected to the PC 2, digital copier 5 and multiplex stencil printer 32 by the LAN 7. The printer selecting unit 37 may included a display 38. The printing system 1D can be constructed without any change in the software of the PC 2. This successfully obviates troubles on the system and enhances maintenance.

Figure 9:
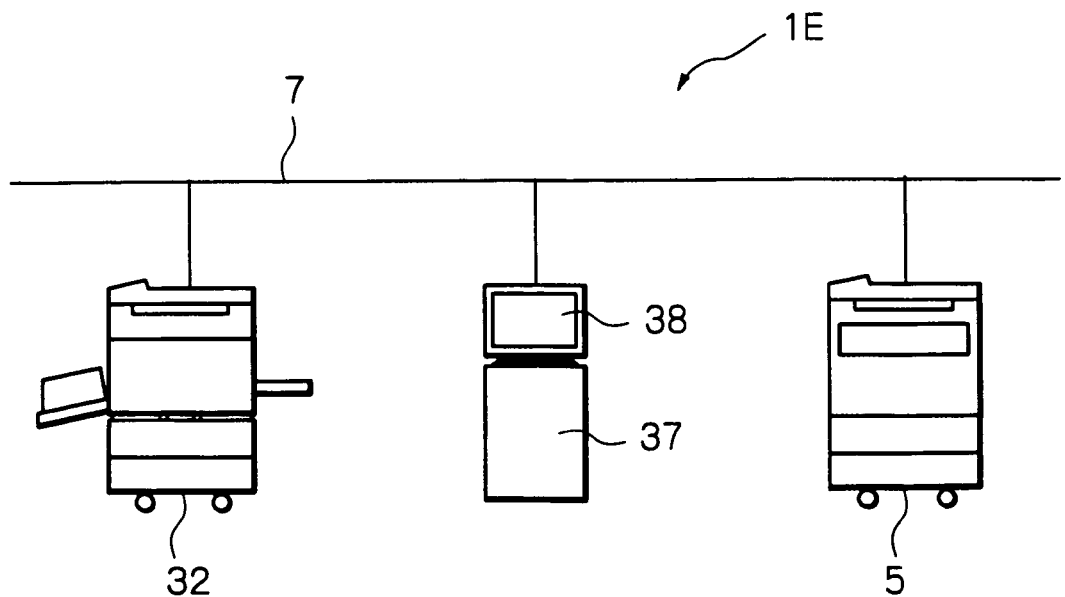

FIG. 9 shows a printing system 1E which is a modified form of the printing system 1D of FIG. 8. As shown, the printing system 1E does not include any PC 2 corresponding to a server, but includes a peer-to-peer or similar simple LAN configuration. The system 1E enhances general-purpose application more than the system 1D and can be used as if it were networked. The system 1E is therefore practicable without resorting to a network.

An alternative embodiment of the present invention will be described with reference to FIGS. 10-12. The structural elements of the alternative embodiment identical with those of the previous embodiment are designated by identical reference numerals and will not be described specifically in order to avoid redundancy. Briefly, while the previous embodiment automatically selects a printer, this embodiment allows the operator to select it. This embodiment is identical in general system configuration with the previous embodiment, but differs from the previous embodiment in that it includes a printer selecting device 41.

Figure 10:
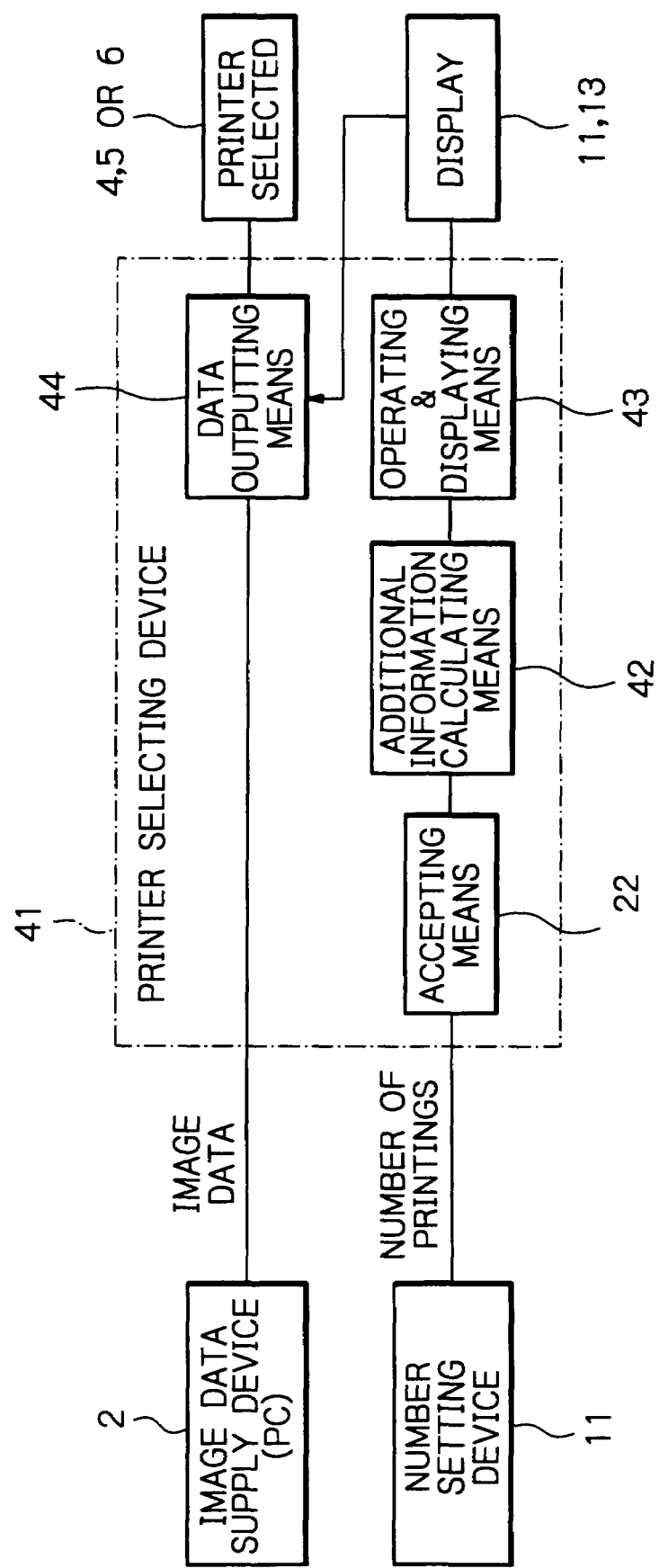
FIG. 10 is a schematic block diagram showing an alternative embodiment of the present invention.

As shown in FIG. 10, the printer selecting device 41 includes additional information calculating means 42, operating and displaying means 43 and data outputting means 44 in addition to the accepting means 22. The controller or microprocessor 14 controls the above various means.

The accepting means 22 accepts a desired number of printings input on the keyboard, or number setting device, 11 when image data prepared by the PC2 or ready by the scanner 3 should be printed out. More specifically, the printer selection utility software stored in the PC 2 plays the role of the accepting means 22. When a print command is input via the application software of the PC 2, the above printer selection utility software starts up and sets a desired number of printings.

The additional information calculating means 42 is informed of the performance of each of the printers 4-6 beforehand. The calculation means 42 calculates, for each of the printers 4-6, a printing cost for a single printing and a printing time necessary for the printer to produce the number of printings accepted by the accepting means 22.

The operating and displaying means 43 causes the display 13 to display the printers 4-6 together with additional information or attributes particular thereto in such a manner that the operator can select any one of them. The additional information each includes a cost for a single printing, a printing time and an image quality level available with a particular printer and determined by the additional information calculating means 42.

The data outputting means 44 automatically sends image data prepared by the PC 2 to the printer 4, 5 or 6 selected on the keyboard 11. Therefore, in the illustrative embodiment, the operating and display section is constituted by the keyboard 11 and display 13.

Figure 11:
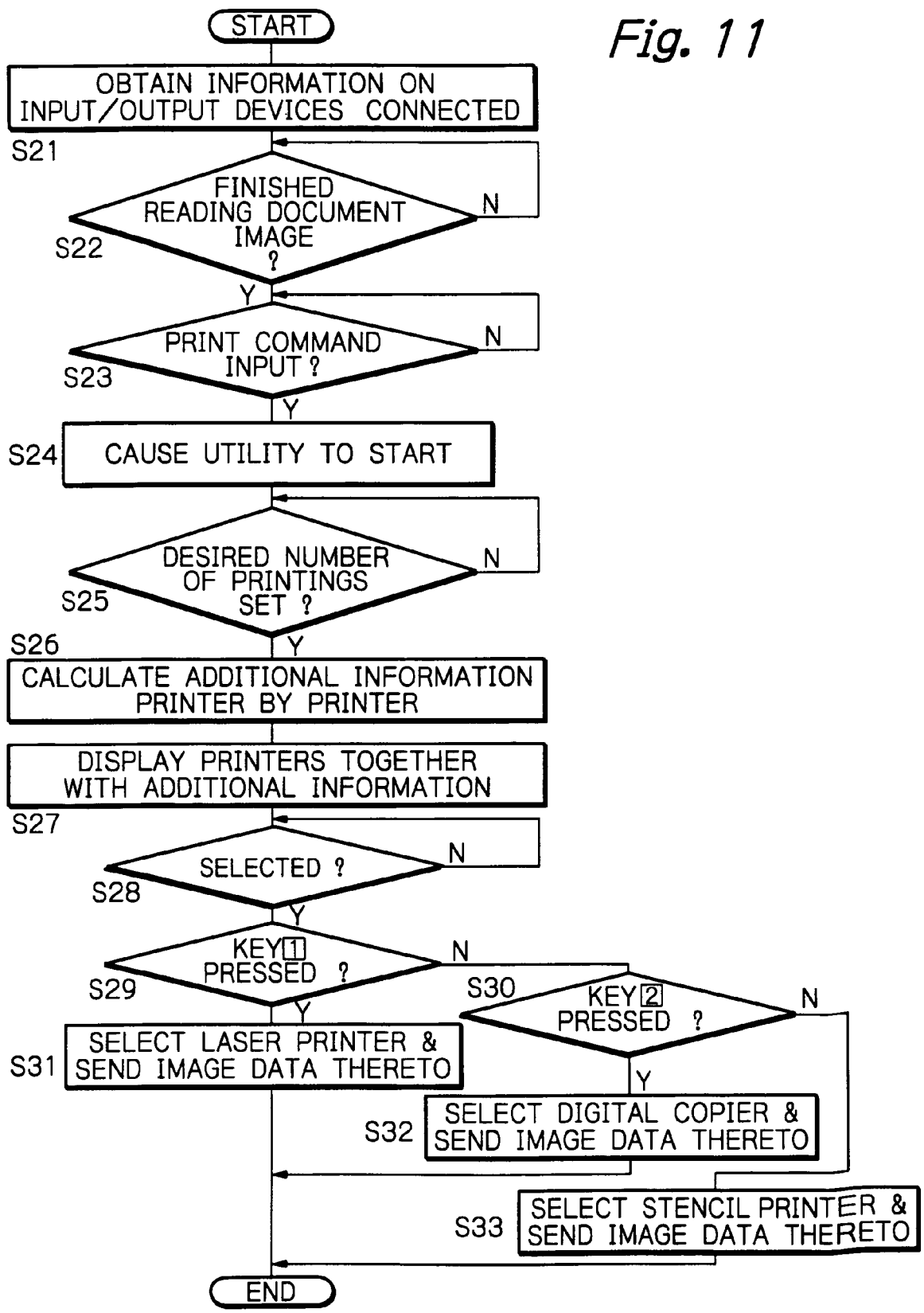
FIG. 11 is a flowchart representative of a specific printer selection procedure particular to the alternative embodiment.

FIG. 11 demonstrates a specific procedure to be executed by the controller or microprocessor 14 with the printer selecting device 41 when image data read by the scanner 3 should be printed out on the basis of the operation of the PC 2. As shown, the controller 14 obtains information on the input and output devices connected to the printing system 1, i.e., the scanner 3 and printers 4, 5 and 6 (step S21). At the same time, the controller 14 obtains the performances of the printers 4-6 including processing speeds and image quality levels. Then, the controller 14 determines whether or not the scanner 3 has finished reading a document image (step S22). If the answer of the step S22 is Y, the controller 14 determines whether or not a print command is input (step S23). If the answer of the step S23 is Y, the controller 14 causes the printer selection utility to start operating (step S24) for executing the following sequence of steps.

First, the printer selection utility determines whether or not the operator has input a desired number of printings on the keyboard 11 (step S25). If the answer of the step S25 is Y, the utility displays printers usable in the network environment together with their attributes including printing costs, image quality levels and printing times. Such attributes are fed from the printers via SNMP (Simple Network Management Protocol) or similar general-purpose protocol, which is a specific network protocol, as MIB (Management Information Base). More specifically, the additional information calculating means 42 calculates, for each of the printers, a printing cost for a single printing and a printing time necessary for the printer to produce the number of printings accepted by the accepting means 22 (step S26). The operation displaying means 43 displays the printers and the above printer-by-printer additional information on the display 13 together with image quality levels available with the printers (step S27). FIG. 12 shows a specific picture to appear on the display 13 and showing the printers and the printer-by-printer additional information determined by the calculating means 42.

Subsequently, the utility determines whether or not the operator watching the display 13 has selected any one of the printers on the keyboard 11 (step S28). If the answer of the step S28 is Y, the utility determines whether a key 1̄, FIG. 12, assigned to the laser printer 4 is pressed (step S29) or a key 2̄, FIG. 12, assigned to the digital copier 5 is pressed (step S30).

When the key 1̄is pressed (Y, step S29), the utility selects the laser printer 4 and causes the data outputting means 44 to send image data to the laser printer 4. When the key 2̄is pressed (Y, step S30), the utility selects the digital copier 5 and causes the data outputting means 44 to send image data to the digital copier 5 (step S32). Further, if the answer of the step S30 is N, meaning that a key 3̄, FIG. 12, is pressed, the utility selects the stencil printer 6 and causes the data outputting means 44 to send image data to the stencil printer 6 (step S33).

As stated above, only if the operator inputs a desired number of printings, the controller 14 shows, based on the number of printings which is a critical factor for the selection of a printer, the printers and additional information or attributes particular thereto on the display 13. The operator can therefore easily select an adequate printer by referencing the additional information. Specifically, the user is capable of comparing the printers with respect to the printing cost, printing time and image quality and easily selecting one of the printer matching with the desired number of printings.

Modern digital copiers each includes a display panel comparable in function with the monitor of a personal computer. This allows the specific picture shown in FIG. 12 to appear even on the operation panel 16 of the digital copier 5, as well known in the art. In such a case, the image output unit itself displays the reference for the user's decision from the standpoint of printing cost, image quality level and printing speed.

In the illustrative embodiment, the printer-by-printer printing costs for a single printing are calculated on the basis of the desired number of printings. The printer selection utility therefore may compare the printing costs and recommend, based on the result of comparison, the operator a particular printer lower in printing cost than the others. For example, the utility may cause, e.g., the key 3 assigned to the stencil printer 6 to blink. Seeing the blinking key 3 and additional information particular thereto, the operator may press the key 3 if the stencil printer 6 is acceptable. Then, a picture showing various settings available with the stencil printer 6, e.g., enlargement/reduction available with a conventional printer driver appears in place of the picture of FIG. 12. After the operator has completed setting on the above picture, printing operation begins. Of course, the operator may press the key 1 or 2 on the picture of FIG. 12 in order to select the laser printer 4 or the digital copier 5.

In the illustrative embodiment, the keyboard 11 and display 13 constituting the operation and display section may be mounted on any other printer, as in the previous embodiment.

In summary, it will be seen that the present invention provides a printing system and a printer selecting device having various unprecedented advantages, as enumerated below.

(1) When a desired number of printings which is an important factor for the selection of a printer is input, one of a plurality of printers matching with the above number is automatically selected. An adequate printer can therefore be easily selected.

(2) When a stencil printer capable of reducing a printing cost for a single printing with an increase in the number of printings is available, the stencil printer is automatically selected if more than a preselected number of printings advantageous in the cost aspect are desired. The stencil printer can therefore be easily selected as an adequate printer.

(3) Because the printer automatically selected appears on a display, the operator can confirm it before actual printing operation.

(4) Assume that the plurality of printers include the stencil printer, and that the desired number of printings is greater than the preselected number. Then, the stencil printer selected by selecting means is displayed together with information showing how much the stencil printer is lower in printing cost than the other printers. The operator can therefore recognize the superiority of, e.g., the stencil printer to the other printers specifically.

(5) The printer selected by the selecting means and appearing on the display can be replaced with another printer. The operator can therefore clearly see the printer selected and make the final decision on the printer to use.

(6) The printers are displayed on the operation and display section together with printer-by-printer additional information based on the number of printings. The operator can therefore easily select adequate one of the printers by referencing the additional information.

(7) The additional information include at least one of a printing cost for a single printing, a printing time, and an image quality level. This allows the operator to easily see a printer advantageous in cost, printing time or image quality and therefore to easily select desirable one of the printers.

(8) A printing system includes a printer selecting device capable of selecting any one of the printers. The system therefore selects an adequate printer easily and makes the most of the advantage of the individual printer. The system is particularly advantageous when the printers include the stencil printer.

(9) The printing system allows the user to customize the printing cost particular to the stencil printer and can therefore be constructed to the user's taste.

(10) The stencil printer is registered at the printer selecting device beforehand as an essential printer. When the stencil printer is not found at the time of operation, the printer selecting device reports the absence of the stencil printer to the operator. Therefore, when, e.g., the power switch of the stencil printer is not turned on, the printer selecting device urges the operator to turn on the power switch. This prevents the stencil printer superior in cost to the other printers from being excluded. This is successful to make the most of the advantage of the stencil printer.

(11) At least one of the printers is implemented as a multiplex image processing machine including an image data supply device and a number setting device. The printing system can therefore include not only a simple printer but also a digital copier or a facsimile apparatus including an operation panel, a scanner and a printer or a stencil printer including a scanner. The multiplex machine may be adaptive to color image formation as distinguished from usual monochromatic image formation. The multiplex machine may include the printer selecting device in addition to the image data supply device and number setting device.

(12) Each printer includes a printer controller for receiving image data to be printed out. At least one terminal unit including the image data supply device, number setting device and printer selecting device and the printer controllers of the printers are interconnected by a communication medium so as to interchange data. Therefore, there can be implemented even a printing system in which a plurality of different kinds of printers each having a simple printing function and personal computers or similar terminal units each including the operation panel, printer selecting device and image data supply device are interconnected by a communication medium.

(13) When the printer selecting device is constructed into a unit, it is not necessary to change or modify, e.g., the software of the system constituents other than the printer selecting device. This obviates troubles on the system and facilitates maintenance.

Various modifications will become possible for those skilled in the art after receiving the teachings of the present disclosure without departing from the scope thereof.

What is claimed is:

1. A printer selecting device comprising:
   accepting means for accepting input information representative of a desired number of printings;
   operating and displaying means for displaying on an operation and display section a plurality of printers together with printer-by-printer additional information indicating at least a printing cost for decision and based on the desired number of printings in such a manner that any one of said plurality of printers can be selected; and
   data outputting means for outputting image data to be printed to the printer selected on said operation and display section.

2. A printer as claimed in claim 1, wherein said printer-by-printer additional information also indicates at least one of a printing time and an image quality level.

3. A printer selecting device comprising:
   an accepting section configured to accept input information representative of a desired number of printings;
   an operating and displaying section configured to display on an operation and display section a plurality of printers together with printer-by-printer additional information indicating at least a printing cost for decision and based on the desired number of printings in such a manner that any one of said plurality of printers can be selected; and
   a data outputting section configured to output image data to be printed to the printer selected on said operation and display section.

4. A printer as claimed in claim 3, wherein said printer-by-printer additional information also indicates at least one of a printing time or an image quality level.

* * * * *